(12) United States Patent
Fries et al.

(10) Patent No.: US 12,396,441 B2
(45) Date of Patent: Aug. 26, 2025

(54) BIOMIMETIC SENTINEL REEF STRUCTURES FOR OPTICAL SENSING AND COMMUNICATIONS

(71) Applicants: David Fries, Pensacola, FL (US); Tim Hutcheson, Pensacola, FL (US); Noam Josef, Pensacola, FL (US); David Millie, Pensacola, FL (US); Connor Tate, Pensacola, FL (US)

(72) Inventors: David Fries, Pensacola, FL (US); Tim Hutcheson, Pensacola, FL (US); Noam Josef, Pensacola, FL (US); David Millie, Pensacola, FL (US); Connor Tate, Pensacola, FL (US)

( * ) Notice: Subject to any disclaimer, the term of this patent is extended or adjusted under 35 U.S.C. 154(b) by 0 days.

(21) Appl. No.: 18/419,998

(22) Filed: Jan. 23, 2024

(65) Prior Publication Data

US 2024/0164353 A1    May 23, 2024

Related U.S. Application Data

(63) Continuation of application No. 17/134,759, filed on Dec. 28, 2020, now Pat. No. 11,877,563, and a continuation-in-part of application No. 16/273,246, filed on Feb. 12, 2019, now abandoned.

(60) Provisional application No. 62/629,249, filed on Feb. 12, 2018.

(51) Int. Cl.
*E02B 3/04* (2006.01)
*A01K 61/73* (2017.01)
*A01K 61/78* (2017.01)

(52) U.S. Cl.
CPC .............. *A01K 61/73* (2017.01); *A01K 61/78* (2017.01)

(58) Field of Classification Search
CPC .......... E02B 3/129; E02B 3/046; E02B 3/043; E02B 2201/04; E02B 17/00; Y02A 40/81; Y02A 10/26; Y02A 40/80; Y02A 10/00; Y02A 10/11; A01K 61/73
See application file for complete search history.

(56) References Cited

U.S. PATENT DOCUMENTS

| | | | | |
|---|---|---|---|---|
| 411,606 A | * | 9/1889 | Parker | A01M 23/32 |
| | | | | 43/90 |
| 433,241 A | * | 7/1890 | Hawkins, Jr. | A01M 23/32 |
| | | | | 43/63 |
| 482,635 A | * | 9/1892 | Hanish | A01K 77/00 |
| | | | | 43/12 |
| 1,336,356 A | * | 4/1920 | Johnson | A01K 69/00 |
| | | | | 43/105 |
| 1,635,899 A | * | 7/1927 | Nohlen | E02B 3/04 |
| | | | | 405/28 |
| 2,603,031 A | * | 7/1952 | Haseman | A01K 69/06 |
| | | | | 43/105 |
| 3,029,546 A | * | 4/1962 | Ruiz | A01K 77/00 |
| | | | | 43/105 |
| 3,119,407 A | * | 1/1964 | Timmerman, Sr. | F16K 21/20 |
| | | | | 141/95 |

(Continued)

*Primary Examiner* — Edwin J Toledo-Duran
(74) *Attorney, Agent, or Firm* — J. Wiley Horton

(57) ABSTRACT

An artificial reef structure including thin tensile members as part of the structure. These tensile members readily accumulate marine life to create a more organic structure. The reef structure can accommodate a wide variety of ocean sensing and communication systems. Embedded lighting and electronic elements can be used to attract and monitor marine life.

6 Claims, 7 Drawing Sheets

(56) References Cited

U.S. PATENT DOCUMENTS

| | | | | |
|---|---|---|---|---|
| 3,133,443 A * | 5/1964 | Timmerman, Sr. | B65D 90/48 | 73/299 |
| 3,215,108 A * | 11/1965 | Otis | B63B 35/44 | 52/654.1 |
| 3,347,210 A * | 10/1967 | Golub | A01K 61/54 | 119/238 |
| 3,422,628 A * | 1/1969 | McDonald | E02B 17/00 | 137/236.1 |
| 3,541,721 A * | 11/1970 | Sexauer | A01K 69/10 | 43/100 |
| 3,628,333 A * | 12/1971 | Newton | E02B 15/06 | 210/242.3 |
| 3,698,359 A * | 10/1972 | Fremont | A01K 61/60 | 119/233 |
| 3,701,261 A * | 10/1972 | Nolan, Jr. | E21B 43/013 | 405/188 |
| 3,803,855 A * | 4/1974 | Malkiel | B65D 88/78 | 114/257 |
| 3,830,066 A * | 8/1974 | Larsen | E02B 3/04 | 405/25 |
| 3,864,049 A * | 2/1975 | Ono | E02B 3/06 | 403/171 |
| 3,879,951 A * | 4/1975 | Mason | E21B 43/0122 | 405/60 |
| 3,898,958 A * | 8/1975 | Pranis, Jr. | E02B 3/046 | 119/221 |
| 3,903,637 A * | 9/1975 | Dorsey | A01K 69/10 | 43/105 |
| 3,922,868 A * | 12/1975 | McDonald | E02B 17/027 | 114/265 |
| 4,058,945 A * | 11/1977 | Knapp | E04B 1/32 | D25/4 |
| 4,074,497 A * | 2/1978 | Ono | E02B 3/06 | 405/35 |
| 4,290,714 A * | 9/1981 | Strange | E21B 41/005 | 405/60 |
| 4,350,143 A * | 9/1982 | Laing | F24S 80/56 | 126/567 |
| 4,373,286 A * | 2/1983 | Robison | A01K 69/00 | 43/10 |
| 4,406,151 A * | 9/1983 | Simonsen | E02D 29/073 | 72/481.2 |
| 4,409,752 A * | 10/1983 | Anderson | A01K 69/06 | 43/105 |
| 4,437,794 A * | 3/1984 | Grimsley | E02B 17/00 | 405/203 |
| 4,447,978 A * | 5/1984 | Robison | A01K 69/00 | 43/10 |
| 4,462,535 A * | 7/1984 | Johnston | E02D 29/063 | 29/469 |
| 4,471,552 A * | 9/1984 | McIntosh | A01K 79/02 | 43/4.5 |
| 4,492,270 A * | 1/1985 | Horton | E02B 17/021 | 405/196 |
| 4,509,285 A * | 4/1985 | Smith | A01K 73/00 | 43/17.1 |
| 4,645,379 A * | 2/1987 | Grimsley | B63B 35/44 | D25/1 |
| 4,679,961 A * | 7/1987 | Stewart | E04B 1/19 | 24/654 |
| 4,957,064 A * | 9/1990 | Koma | A01K 61/60 | 119/223 |
| 5,027,735 A * | 7/1991 | Labrador | B63B 43/06 | 114/39.29 |
| 5,044,828 A * | 9/1991 | Berner, Jr. | E02B 17/0004 | 52/651.07 |
| 5,056,447 A * | 10/1991 | Labrador | B63H 9/069 | 416/8 |
| 5,172,649 A * | 12/1992 | Bourgeois | A01K 61/60 | 119/223 |
| 5,265,395 A * | 11/1993 | Lalvani | E04B 1/32 | 403/176 |
| 5,347,745 A * | 9/1994 | Authement | A01K 75/04 | 43/44.91 |
| 5,427,472 A * | 6/1995 | Ono | E02B 3/06 | 405/21 |
| 5,477,798 A * | 12/1995 | Ness | B63B 3/13 | 114/65 R |
| 5,480,261 A * | 1/1996 | Meyers | E02B 15/0885 | 405/63 |
| 5,556,229 A * | 9/1996 | Bishop | E02B 3/04 | 405/32 |
| 5,617,813 A * | 4/1997 | Loverich | A01K 61/60 | 119/223 |
| 5,628,279 A * | 5/1997 | Bones, IV | A01K 61/60 | 119/223 |
| 5,713,303 A * | 2/1998 | Willinsky | A01K 61/17 | 119/223 |
| 5,797,348 A * | 8/1998 | Taherzadeh | A01K 61/80 | 119/223 |
| 6,035,575 A * | 3/2000 | Hilty | A01K 69/06 | 43/100 |
| 6,106,194 A * | 8/2000 | Angel | B66C 1/12 | 405/17 |
| 6,186,702 B1 * | 2/2001 | Bartkowski | A01K 61/70 | 119/221 |
| 6,234,715 B1 * | 5/2001 | Ono | E02B 3/06 | 405/21 |
| 6,318,931 B1 * | 11/2001 | Khachaturian | B63B 27/10 | 405/209 |
| 6,327,994 B1 * | 12/2001 | Labrador | B63B 39/06 | 114/382 |
| 6,367,399 B1 * | 4/2002 | Khachaturian | B63B 77/00 | 114/61.1 |
| 6,931,812 B1 * | 8/2005 | Lipscomb | E04B 1/19 | 52/653.1 |
| 7,448,827 B2 * | 11/2008 | Li | E02D 29/0216 | 405/116 |
| 7,540,814 B2 * | 6/2009 | Dilling | A63B 63/00 | 473/476 |
| 7,612,735 B2 * | 11/2009 | Essig, Jr. | A01K 61/60 | 343/915 |
| D607,081 S * | 12/2009 | Harper | D22/199 | |
| D607,082 S * | 12/2009 | Harper | D22/199 | |
| 7,681,528 B2 * | 3/2010 | Ytterland | A01K 61/60 | 119/203 |
| 7,686,543 B2 * | 3/2010 | They | E01D 19/02 | 405/224.1 |
| 7,748,349 B2 * | 7/2010 | Thorvardarson | A01K 61/60 | 119/223 |
| 8,683,955 B2 * | 4/2014 | Madsen | A01K 61/65 | 119/223 |
| 2002/0185079 A1 * | 12/2002 | Truebe | E02B 1/006 | 119/219 |
| 2003/0168864 A1 * | 9/2003 | Heronemus | B63B 35/44 | 290/55 |
| 2004/0148901 A1 * | 8/2004 | Cadogan | E04H 15/20 | 52/646 |
| 2005/0115186 A1 * | 6/2005 | Jensen | E01F 9/696 | 52/633 |
| 2005/0235921 A1 * | 10/2005 | Niezrecki | A01K 61/60 | 119/223 |
| 2006/0033674 A1 * | 2/2006 | Essig | F24S 23/715 | 343/915 |
| 2006/0056914 A1 * | 3/2006 | Arai | E02B 3/046 | 405/30 |
| 2006/0062676 A1 * | 3/2006 | Jakubowski | B63B 35/44 | 416/244 R |
| 2007/0039254 A1 * | 2/2007 | Onda | B63C 11/49 | 52/81.1 |
| 2008/0110408 A1 * | 5/2008 | Thorvardarson | A01K 61/10 | 119/223 |
| 2009/0035068 A1 * | 2/2009 | Terai | B63G 9/04 | 405/211 |
| 2010/0018470 A1 * | 1/2010 | Kim | A01K 61/60 | 119/223 |
| 2010/0229545 A1 * | 9/2010 | Griffin | F03D 9/008 | 60/497 |

(56) References Cited

U.S. PATENT DOCUMENTS

| | | | |
|---|---|---|---|
| 2011/0031062 A1* | 2/2011 | Elmer | E02D 13/005 181/175 |
| 2011/0174232 A1* | 7/2011 | Hoie | A01K 61/60 119/223 |
| 2011/0296908 A1* | 12/2011 | Kjerstad | H01Q 1/04 248/440.1 |
| 2011/0318106 A1* | 12/2011 | Gateff | B63C 7/006 405/80 |
| 2012/0006277 A1* | 1/2012 | Troy | A01K 61/65 119/226 |
| 2012/0132123 A1* | 5/2012 | Khachaturian | B63B 27/16 114/268 |
| 2012/0167829 A1* | 7/2012 | Madsen | A01K 61/10 119/223 |
| 2012/0199078 A1* | 8/2012 | Krone | A01K 61/70 43/103 |
| 2013/0129421 A1* | 5/2013 | Belzile | E02B 15/0807 405/63 |
| 2013/0320678 A1* | 12/2013 | Kittel | F03B 13/10 415/7 |
| 2014/0138955 A1* | 5/2014 | Fransen | E02B 3/20 290/54 |
| 2014/0158171 A1* | 6/2014 | Doleshal | B08B 3/024 134/172 |
| 2014/0356069 A1* | 12/2014 | Gateff | E02B 15/04 405/80 |
| 2015/0023734 A1* | 1/2015 | Higgins | B09C 1/00 405/128.2 |
| 2015/0063910 A1* | 3/2015 | Meltsov | E02B 8/00 114/230.14 |
| 2015/0136012 A1* | 5/2015 | Williams | B25J 9/08 901/1 |
| 2015/0150223 A1* | 6/2015 | Robinson | A01K 61/60 119/223 |
| 2015/0152614 A1* | 6/2015 | Burt | B28B 7/00 405/23 |
| 2015/0167288 A1* | 6/2015 | Harkin | B64D 11/064 403/107 |
| 2015/0330046 A1* | 11/2015 | Betcher | E02B 3/062 405/26 |
| 2016/0183501 A1* | 6/2016 | Page | A01K 61/60 119/223 |
| 2017/0036782 A1* | 2/2017 | Dula | B64G 1/402 |
| 2017/0055502 A1* | 3/2017 | Gagliano | E02B 3/046 |
| 2017/0233965 A1* | 8/2017 | Boasso | E02B 3/121 405/20 |
| 2018/0080744 A1* | 3/2018 | Osienski | F41H 11/05 |
| 2018/0317461 A1* | 11/2018 | Meeker | A01K 61/10 |
| 2019/0029231 A1* | 1/2019 | Becher | A01K 61/60 |
| 2019/0150410 A1* | 5/2019 | Dwyer | A01K 61/80 |
| 2019/0340440 A1* | 11/2019 | Atwater | G06T 7/20 |
| 2019/0387721 A1* | 12/2019 | Dobson | A01K 61/60 |
| 2020/0281168 A1* | 9/2020 | Hellesøe | H02S 10/40 |
| 2020/0281169 A1* | 9/2020 | Hellesøe | A01K 61/80 |
| 2021/0400927 A1* | 12/2021 | Østerhus | F03B 13/142 |
| 2022/0132819 A1* | 5/2022 | Chadwick | A01K 69/08 43/102 |
| 2022/0183261 A1* | 6/2022 | Gray | A01K 61/55 |
| 2024/0401300 A1* | 12/2024 | Yang | E02B 3/16 |

* cited by examiner

BIOMIMETIC SENTINEL REEF STRUCTURES FOR OPTICAL SENSING AND COMMUNICATIONS

CROSS-REFERENCES TO RELATED APPLICATIONS

This non-provisional patent application is a continuation of U.S. patent application Ser. No. 17/134,759 (now U.S. Pat. No. 11,877,563). The parent application listed the same inventors.

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

The present invention pertains to the field of artificial reefs. More specifically, the invention comprises a novel reef structure that incorporates optical transmission, sensing, and communications.

2. Description of the Related Art

Many current beaches have little fish habitat. Where no vertical structure is present, fish have nowhere to spawn and hide from predators. Fisheries refugia (natural and artificial reefs) are marine areas in which specific management measures are applied to sustain important species. Natural fisheries refugia can be a model for the creation of artificial reefs. Evidence from existing marine reserves indicates that the presence of reef structures increases fish abundance and diversity. For this reason, artificial reefs have been introduced in areas lacking sufficient structure.

Traditional artificial reef structures are designed with uniform cellular architectures. Their topologies do not mimic natural reef forms. A good example is an artificial reef structure made of steel reinforced concrete. These structures often include a central volume that is accessed through a series of holes in its exterior walls. Stones or shells may be added to the exterior surface to better simulate a natural reef. Even so, cast concrete structures do not tend to accurately mimic a natural reef.

On the other hand, strings and ropes are a proven fisheries and mariculture construction element. They are used throughout the world as artificial reef scaffolding. A wide variety of marine life adheres to the strings and ropes and transforms the assembly into a more organic structure. The present invention takes advantage of this fact, among other things.

BRIEF SUMMARY OF THE INVENTION

The present invention comprises an artificial reef structure including thin tensile members as part of the structure. These tensile members readily accumulate marine life to create a more organic structure. The reef structure can accommodate a wide variety of ocean sensing and communication systems. Embedded lighting and electronic elements can be used to attract and monitor marine life.

Figure 1:
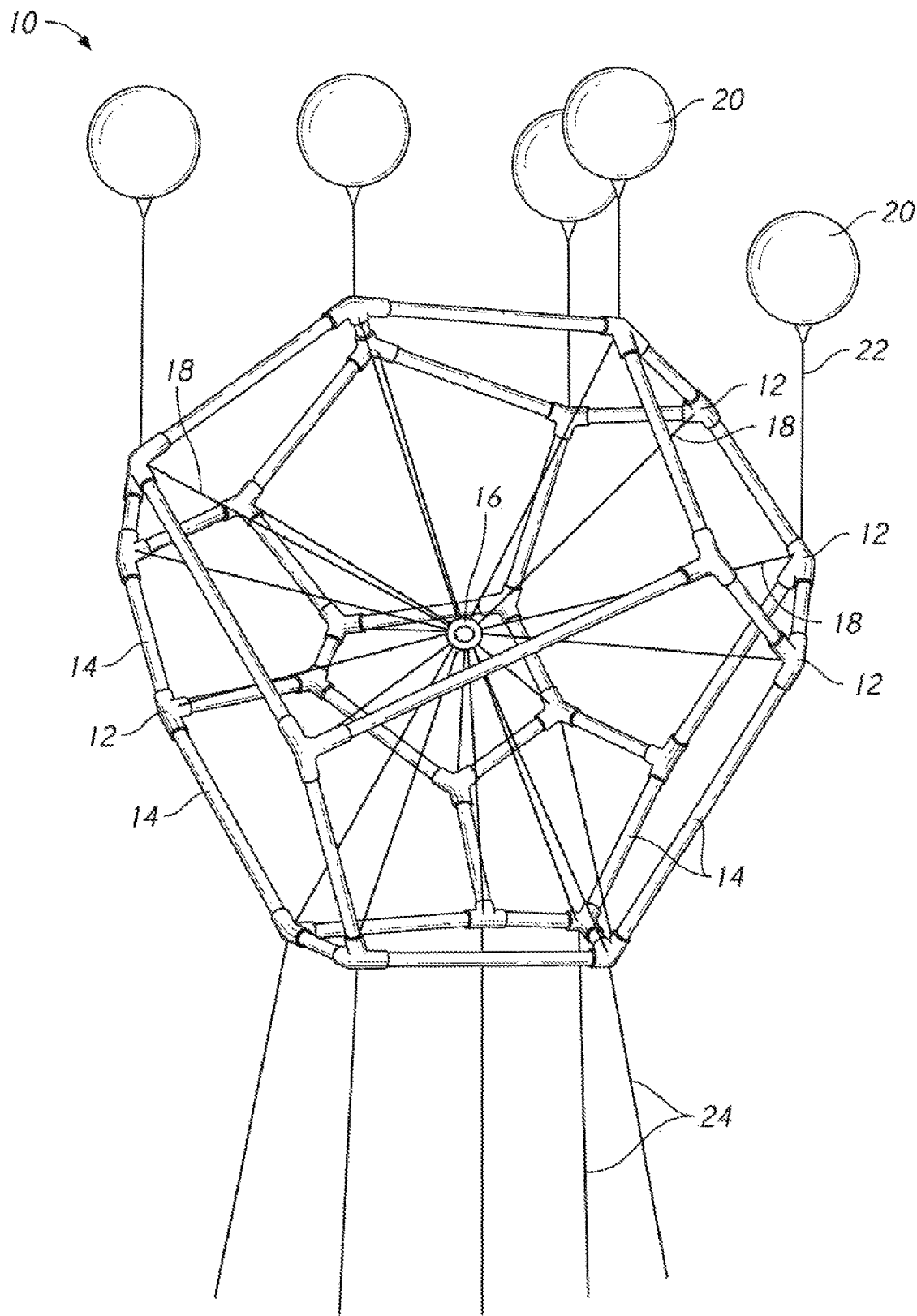
FIG. 1 is perspective view, depicting an artificial reef made according to the present invention.

REFERENCE NUMERALS IN THE DRAWINGS 10 artificial reef
12 joint
14 link
16 connector
18 tension member
20 float
22 float line
24 mooring line
26 sheet
28 gap
29 light array
30 controller
32 instrument package
34 flexible array
36 projector array
38 projector
40 projector field of view
42 image
44 first leg
46 second leg
48 third leg
50 receiver
52 anchor point

DETAILED DESCRIPTION OF THE INVENTION

Figure 2:
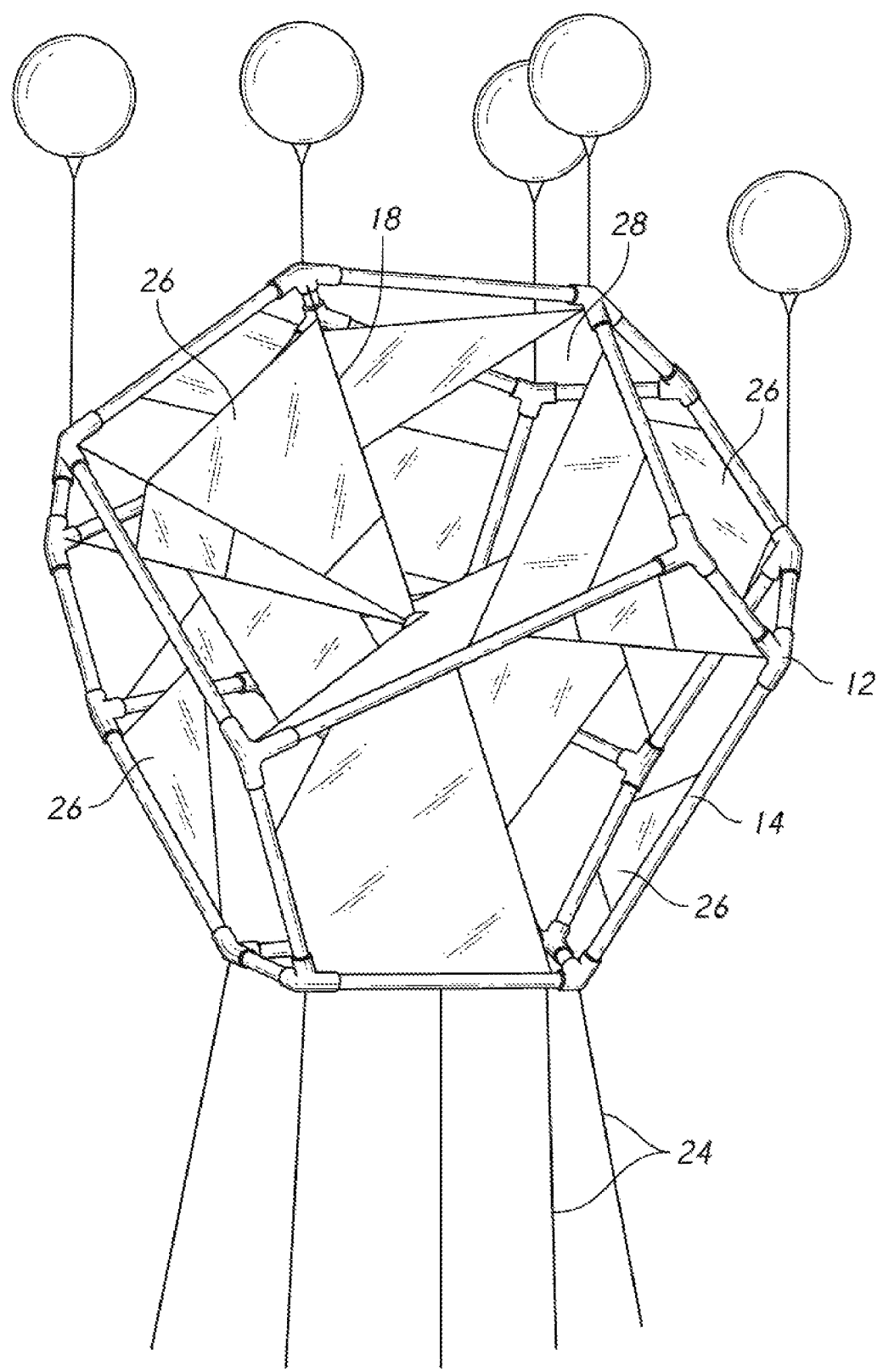
FIG. 2 is a perspective view, depicting the reef of FIG. 1 with the addition of a plurality of panels.
Figure 3:
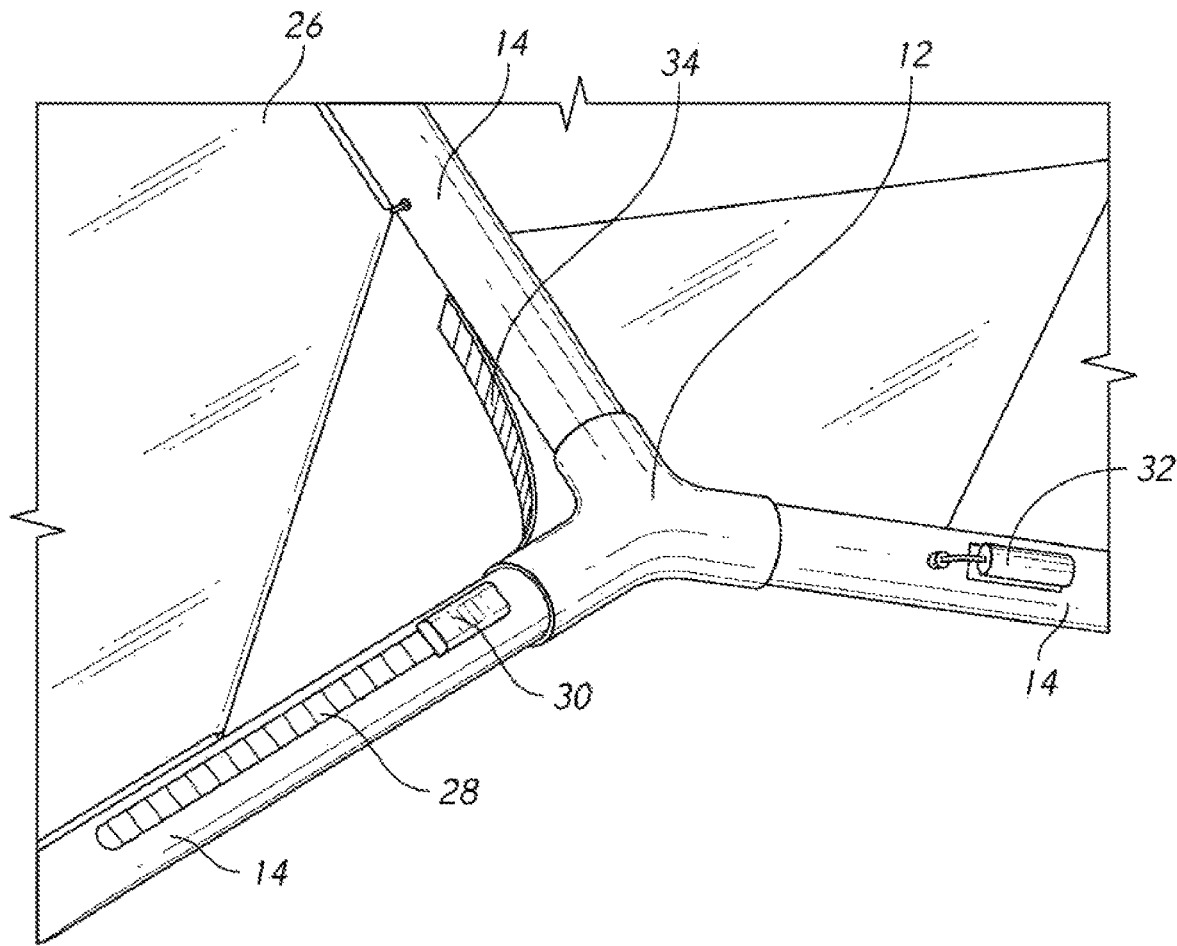
FIG. 3 is a detailed perspective view, showing the inclusion of light elements and sensory elements on the reef structure of FIG. 1.

The present invention may be realized using a wide variety of structures. A single exemplary structure is depicted in FIGS. 1-3. This exemplary structure will be described in detail, but the reader should keep in mind that many other structures are possible.

The inclusion of rope or string-like tensile members is an important feature of the present invention. The structure depicted in FIG. 1 includes a great many tensile members. The structure is created by connecting links 14 together using joints 12. In this version, each joint includes three hollow cylindrical receivers configured to receive the cylindrical end of a link 14. The structure is designed so that the tension members 18 are placed in tension and links 14 are placed in compression. This allows the structure to be held together without adhesives.

Connector 16—which may be an assembly of multiple pieces—is placed approximately in the open center of the structure. A tension member 18 is then connected between each joint 12 and connector 16. Turnbuckles or similar devices may be included in each tension member 18 to gradually increase the tension until the structure as a whole is in a rigid and balanced state. Additional tension members may be added that link two existing tension members together. In other words, "cross-lacing" tension members may be added to increase the density of tension members.

The reef structure may be placed on the bottom of a body of water or it may be free-floated some distance above the bottom. Buoyancy is required for a free-floating structure. It is possible to provide the desired buoyancy by making the links and/or joints buoyant. External buoyancy may also be added. In the example of FIG. 1, a plurality of floats 20 are connected to the structure via float lines 22. The structure is anchored to the sea floor via mooring lines 24. Using this approach, the artificial reef may be positioned at a desired depth and retained there. It is often preferable to anchor the structure in the benthic zone proximate the floor of a body of water. The structure shown in FIG. 1 is well suited to this purpose.

FIG. 2 shows the same artificial reef structure following the addition of a set of sheets 26. Sheets 26 may be made of a variety of materials. Some sheets are a piece of dense netting stretched between links, joints, and tension members. At least one side of the sheet is preferably angled toward the open center of the reef structure—with at least one portion of the sheet being secured within the interior of the structure. This adds geometric complexity and creates many internal passages. Some sheets may be made of PVC having various opacities. The sheets preferably do not continuously cover any portion of the reef structure. Rather, they leave gaps 28.

Marine life (such as barnacles) will adhere to the tension members and the sheets. The marine life will grow, bridge, and fuse in unpredictable ways. The result will be a primarily organic structure where the supporting links, joints, and tension members are buried in growth. The supporting links, tension members, and joints may be made of a material which will eventually degrade and disintegrate, leaving a structure comprised only of marine life.

It is desirable for the reef to include light sensing elements, light producing elements, and various other sensing and communicating elements. FIG. 3 shows a first example. Light array 29 is placed on the interior-facing side of a link 14. Controller 30 controls this light array. Light produced by the array tends to fall on one or more adjacent sheets 26. The light array preferably includes multiple LED's that can be used to produce a variety of wavelengths. The array can be controlled to produce a rippling or shimmering effect that tends to attract fish to the structure.

Flexible array 34 bends around joint 12 as shown. It may be used to produce a second controlled lighting effect. Instrument package 32 contains instruments to monitor the water flowing through the reef structure (such as salinity, specific gravity, etc.). All these instruments may be centrally controlled and networked together.

Figure 4:
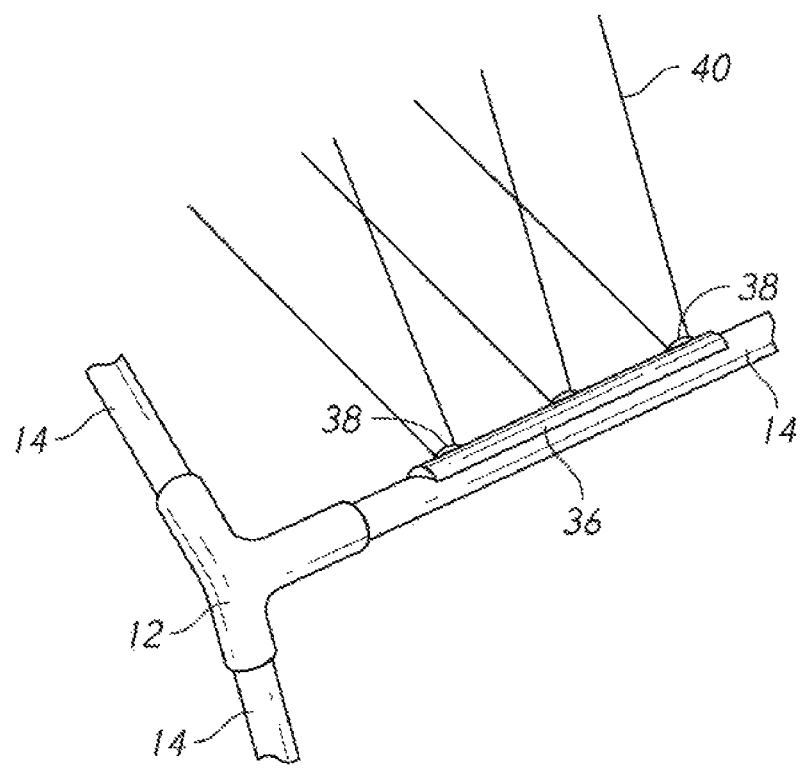
FIG. 4 is a detailed perspective view, showing an exemplary location for a projector array.

FIG. 4 shows a second exemplary device that is used to create lighting effects. Projector array 36 contains three separate LED projectors 38 in a waterproof housing. Each projector 38 projects a diverging image extending across a conical field of view 40. The projector array shown in FIG. 4 is positioned to create a moving light image on an adjacent sheet or sheets.

Figure 5:
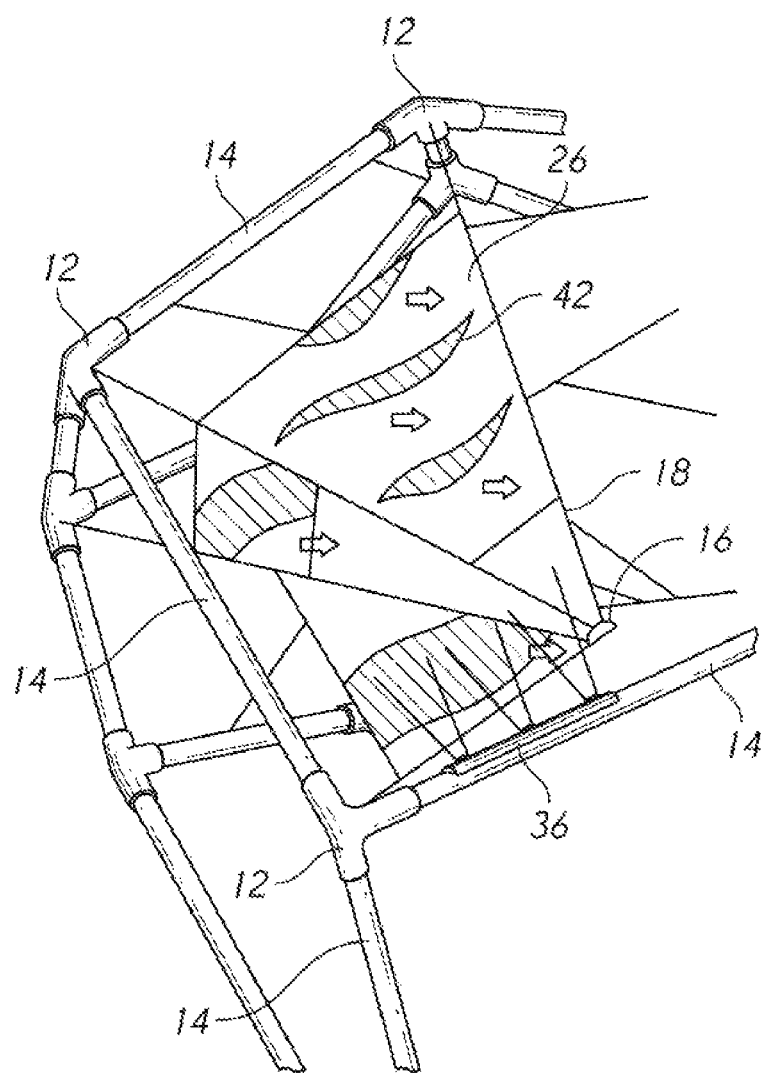
FIG. 5 is a detailed perspective view, showing the formation of moving projected images on the sheets.

FIG. 5 shows the same projector array 36—along with more of the surrounding structure. The projector array creates one or more images 42 on the adjacent sheets 26. These images are configured to move as indicated by the arrows. The images need not be sharply focused. An image that is effective for attracting marine life is one that simulates the rippling light patterns produced by light refracting through surface wave action. It is preferable for the projecting system to have significant depth of field so that the plane of the sheet need not be perpendicular to the projection axis.

In order to facilitate a cost-effective deployment for the reef structure that can be achieved globally, the materials need to be universally applicable and accessible to the public and private sector. Construction materials can include concrete, PVC, polypropylene rope, 3D printed joints (selecting from confirmed non-toxic materials/FDA approved/high tensile strength including ABS, Nylon, TGlase/Pett and steel). Embedded optics may be added to the structure.

A standard design includes a polypropylene rope tension structure configured in a complex web running through the center of the module. These ropes will accrue growth to attract small demersal fish and arthropods to develop a feeding ground for stock fish. The rope tension members will also remain strong and durable with no significant degradation. In connection with the ropes are complex interstitial spaces of varied size created through the use of hollow, solid, clear and opaque PVC's. The variation in opacity and interior spaces will allow for implementation of sensing technology as well as provide visual protection to a variety of species. The stringed reef systems can be resident at the benthic layer or moored as floating reefs in the water column floating away from any substrate completely undisturbed. The lightweight design and flexible string scaffolding makes these materials more durable against the elements and the materials used are designed against corrosion.

The distributed cables and string approach allows three-dimension fluid flow through the structure. The three-dimension structure provides protective spaces and also allows contiguous paths for nutrients, light and signaling. Past work by others (Shashar and Josef et. al.) in the Red Sea exhibit successful reef productivity for corals and fish within a coarse mesh volume. Additional work for oysters in local Gulf of Mexico waters in the Pensacola area used wired cabled mesh system with highly successful reef development, health, and resilience.

Returning now to FIG. 1, some of the significant aspects of the inventive structure will be explained in more detail. As stated previously, the structure is configured to use tension in tension members 18 to place all links 14 in compression. The reader will note that the overall shape of the exterior is made of intersecting planar "rings." Most of the planar rings in the configuration shown have five links 14 joined by six joints 12. The links in each ring lie primarily in a single plane. The word "primarily" is used because the links are preferably made of flexible material. Some out-of-plane flexing is allowed to occur as the structure is drawn tight. This allowance means that the dimensions are not critical. In fact, a single ring can be twisted by as much as 30 degrees.

Figure 6:
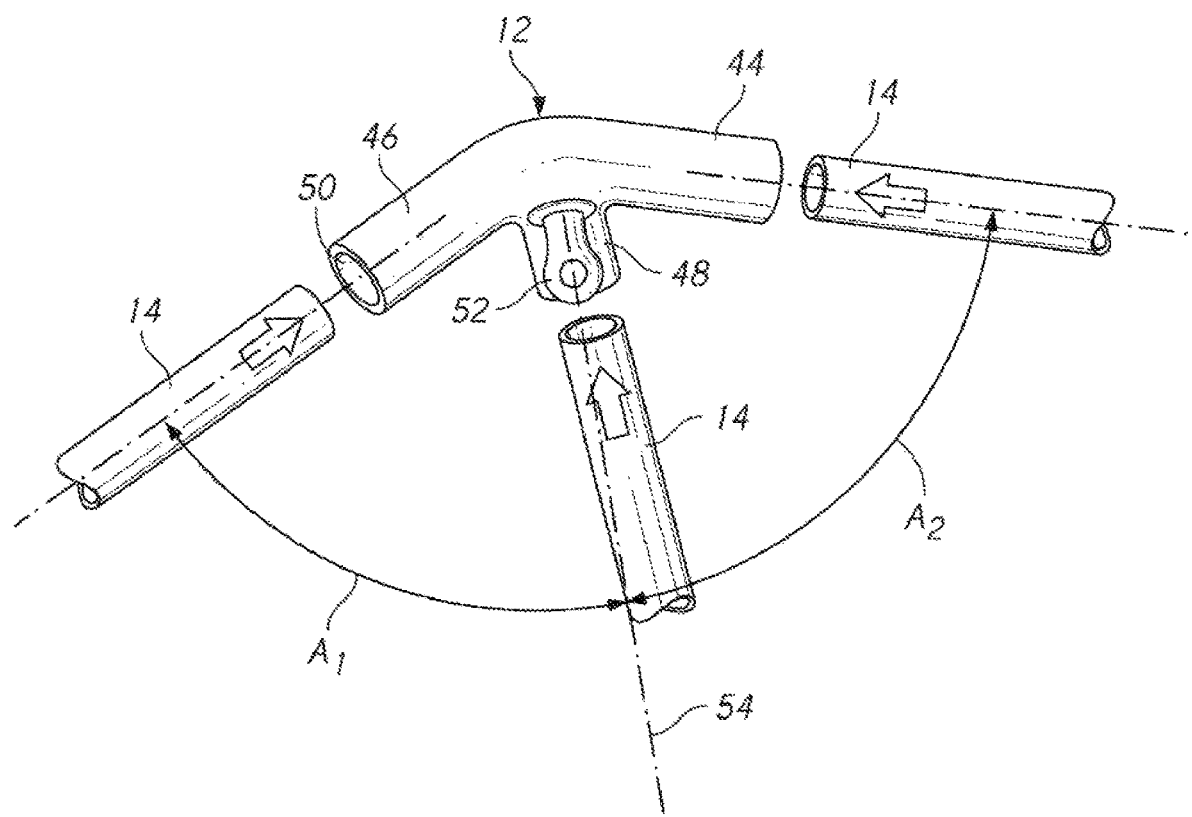
FIG. 6 is an exploded perspective view, showing the nature of the joints used in the inventive structure.
Figure 7:
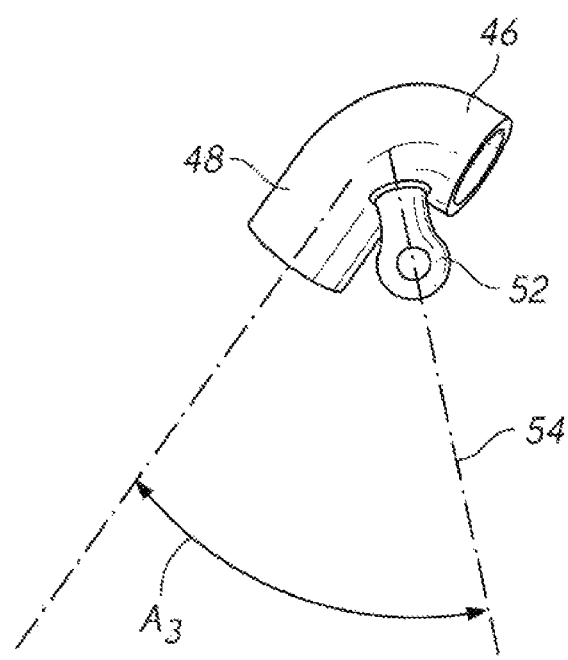
FIG. 7 is an elevation view, showing the joint of FIG. 6 from a different vantage point.

FIGS. 6 and 7 provide more details regarding the components comprising the structure shown in FIG. 1. Each joint 12 includes three legs configured to receiver the ends of three links 14. First leg 44, second leg 46, and third leg 48 all include a receiver 50 sized to slidably receive the outer diameter of a link 14. An end of each link 14 can be slid into joint 12 as indicated by the arrows.

Anchor point 52 is provided on the side of joint 12 facing inward toward connector 16 (shown in FIG. 1). The angles between the three legs are set to ensure that a tension member attached to anchor point 52 will place the links in compression. Axis 52 indicates the position of a tension member attached to anchor point 52.

The geometry of the three legs 44,46,48 is set so that the angle between the centerline of any leg and axis 54 will be less than 90 degrees (an acute angle). The reader will note that angle A1 is an acute angle and that angle A2 is also an acute angle. FIG. 7 shows the same joint 12 from the side. The reader will observe that the angle A3 between the centerline of third leg 48 and axis 54 is also an acute angle.

The same is true for each of the legs in each of the joints. The angle between all the legs and the axis of the tension member coming off a particular joint will always be acute. This fact means that tension placed on the tension members tends to pull the entire structure inward and place all the links in compression.

Light has been used for centuries to attract marine organisms and light in the reef is a crucial cue for attracting larvae. Underwater light contrast and color also play important roles in the fish larvae's capability to detect a potential settlement habitat. The inventive artificial reef includes light arrays as shown in FIG. 3. These can be used to mimic natural patterns and thereby attract selected species.

The inventive reef preferably includes optical sensing as well. Underwater optical sensing and mobility can be challenging due to the absorptive properties of water for many of the optical signals necessary for navigation, communications and control. Optical sensing beyond the normal localized spaces above single element sensors is needed. Distributed sensor systems can be an effective solution for making both proximal and large volume measurements necessary for underwater optical sense and control. Furthermore, spatial light measurements allow optical flux visualizations of water column mass transport, as well as the accurate measurement of chemicals and particles. All of these are key parameters for understanding the subsea environment. Such distributed optical sensor arrays require new systems architectures and new methods of opto-electronic fabrication and construction. In general, light based measurements are the most accessible and cost effective path to creating distributed sensors.

The inventive artificial reef structure allows for the wide distribution of sensors. Natural (biological) systems use distributed sensing and arrays frequently as solutions for sensing or controlling a local environment. Electronic systems similarly use area array architectures also (CSP, BGA's, Flip Chip). Through the use of bio-inspiration, a framework is laid out to base further research on a new style of optical reefs and opto-robotic vehicles (tension-member based drones) for the subsea but the need for new approaches to opto-electronic systems fabrications is needed as well. Using bio-inspiration, radiolarian exoskeletons take on a grid-like 3D pattern creating a cage around the interior and producing strong scaffolding, similar to the string 3D architectural designs. Using the exoskeleton's form and function new styles of sentinel reefs emerge based on open frames with distributed tension members for opto-electronic systems to be embedded, coated or strapped on. These tension frame subsea systems require integrated tension electronic packaging, that is, electronic components, devices and systems that are integral to the tension structural membrane of the sentinel system. In this way the tension member is both mechanical and electronic in nature, similar to PCBs, but shifted to cylindrical geometries which are more hydrodynamic and deep water pressure friendly. Using flex based packaging substrates as a core building material, and projection optical patterning various components have been fabricated that are planar, tubular and flexible. Three-dimensional digital fabrication may also be used for the production of the rigid structural framework for holding members in tension. The use of three-dimensional printing permits geometrical, shaped bulk objects that can then be paired with flex electronics emerging from printed and flexible electronics.

Integrated electronics and microelectronics are typically designed and fabricated from a planar architecture perspective which then dominates subsequent packaging of such electronic systems. Non planar geometries and wiring are a growing area of electronic design, fabrication and packaging. Novel fibers, printed and flexible sheets allow design of new systems architectures. Additionally, flexible microsystems based on structured, fiber or non-fiber filled PCB laminates and printed electronics permits packaging at the local (micro) substrate scale and at the macro scale with the ability to flex the system across millimeter to centimeter lengths on real everyday systems. Applying such novel electronic packaging strategies (tubular, cylindrical, and flexible sheets) compliments well the undersea environment where planar-boxy and sharp corners prevent survivable pressure and waterproof packaging. Using this microsystems design strategy with modified 2D/3D manufacturing processes a new class of subsea sensors become possible which depart from the classic cylindrical design paradigm. These designs are based on tension frames with electronic micro sensors, components and structures being held in tension as distributed networks of strings, conductors and cables. Hydrodynamic friendly surfaces and subsea sensing systems (both mobile and fixed) emerge from this microelectronics and microsystems packaging approach.

A sentinel reef in an array can form an optical-spectral broadcast system for network communications, underwater drone imaging detectability and tracking in variable environmental conditions. Each cell of the network is an onboard adaptive optical broadcast subsystem that can vary its transmissions spectrally, and spatially using multiple transceivers, and temporally with time-based encodings.

Free space optical wireless communications and networking has a variety of competitive advantages over acoustics including high bandwidth density, security, energy consumption and aesthetics. It uses a highly unregulated part of the spectrum (visible light) for ease of transmissions. Combining acoustics and free space optical communications, can exploit the benefits of complementary path diversity. To ensure maximum robustness to changes in environmental light conditions, adaptive spectral transmissions from the light source are easily deployed using existing low cost multi-color solid-state optoelectronics. Ongoing work focuses on spatial and addressable lighting, waterproofing, light composing, and adaptive low power optoelectronics and integration into underwater test system.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims ultimately drafted, rather than by the examples given.

We claim:

1. An artificial reef structure configured to be moored to the sea floor, comprising:

a. an open frame comprising a plurality of links connected by a plurality of joints;
b. said open frame including a plurality of rings of said links, with each of said rings lying primarily in a plane, with no two rings lying in the same plane;
c. said open frame creating a three-dimensional structure;
d. a connector lying within a central position within said three-dimensional structure;
e. a plurality of tension members, wherein each of said tension members runs between one of said joints and said connector;
f. wherein each of said joints, includes,
   (i) an anchor point attached to one of said tension members,
   (ii) a first leg, a second leg, and a third leg, with each of said first, second, and third legs including a receiver slidably receiving an end of one of said links,
   (iii) wherein a first angle between said first leg and said tension member attached to said anchor point is acute,
   (iv) wherein a second angle between said second leg and said tension member attached to said anchor point is acute,
   (v) wherein a third angle between said third leg and said tension member attached to said anchor point is acute;
g. said connector being positioned so that every link in said structure is placed in compression by said tension members;
h. said tension members lying outside a single plane; and
i. a mooring line configured to moor said artificial reef structure above said sea floor and below a sea surface.

2. The artificial reef structure as recited in claim 1, further comprising a float connected to said open frame.

3. The artificial reef structure as recited in claim 1, further comprising:
   (a) a plurality of sheets connected to said open frame; and
   (b) a light array configured to shine light on a sheet of said plurality of sheets.

4. The artificial reef structure as recited in claim 3, wherein said light array is controlled to produce a moving image upon said sheet.

5. The artificial reef structure as recited in claim 1, further comprising an instrument package configured to monitor water flowing through said open frame.

6. The artificial reef structure as recited in claim 1, further comprising:
   (a) a plurality of sheets connected to said open frame; and
   (b) a light array configured to shine light on a sheet of said plurality of sheets.

* * * * *